United States Patent
Cai et al.

(10) Patent No.: US 11,296,497 B2
(45) Date of Patent: Apr. 5, 2022

(54) SURGE PROTECTION CIRCUIT AND ELECTRONIC DEVICE USING THE CIRCUIT

(71) Applicant: SHENZHEN BENCENT ELECTRONICS CO., LTD., Guangdong (CN)

(72) Inventors: Jinbo Cai, Dongguan (CN); Guoyuan Chen, Dongguan (CN); Shenghui Luo, Dongguan (CN); Ming Li, Dongguan (CN)

(73) Assignee: SHENZHEN BENCENT ELECTRONICS CO., LTD., Shenzhen (CN)

( * ) Notice: Subject to any disclaimer, the term of this patent is extended or adjusted under 35 U.S.C. 154(b) by 133 days.

(21) Appl. No.: 16/474,280

(22) PCT Filed: Dec. 14, 2017

(86) PCT No.: PCT/CN2017/116175
§ 371 (c)(1),
(2) Date: Jun. 27, 2019

(87) PCT Pub. No.: WO2018/121278
PCT Pub. Date: Jul. 5, 2018

(65) Prior Publication Data
US 2019/0341771 A1    Nov. 7, 2019

(30) Foreign Application Priority Data

Dec. 28, 2016    (CN) .......................... 201611237528.6

(51) Int. Cl.
*H02H 9/04*    (2006.01)
(52) U.S. Cl.
CPC .............. *H02H 9/04* (2013.01); *H02H 9/041* (2013.01)

(58) Field of Classification Search
CPC .......... H02H 9/00; H02H 9/041; H02H 9/043; H02H 9/045; H02H 9/046; H02H 3/20; H02H 3/22; H01C 8/04; H01L 29/7424
See application file for complete search history.

(56) References Cited

U.S. PATENT DOCUMENTS 4,174,495 A * 11/1979 Rosa ................. H03K 17/08144
                                                                                  323/326
4,912,589 A *  3/1990 Stolarczyk ............... H02H 9/04
                                                                                     337/28
(Continued)

FOREIGN PATENT DOCUMENTS

CN    103795045 A    5/2014
CN    104269835 A    1/2015
(Continued)

OTHER PUBLICATIONS

International Search Report, English Translation 2 pages and in Chinese 2 pages.
(Continued)

*Primary Examiner* — Gustavo A Rosario-Benitez
(74) *Attorney, Agent, or Firm* — Brown Rudnick LLP

(57) ABSTRACT

Provided is a surge protection circuit, which includes a bidirectional voltage suppressor; and a thyristor surge suppression unit connected in parallel with the bidirectional voltage suppressor. The first end of the bidirectional voltage suppressor is connected to the first end of the thyristor surge suppression unit, and the second end of the bidirectional voltage suppressor is connected to the second end of the thyristor surge suppression unit. The breakover voltage or the breakdown voltage in the direction from the first end to the second end of the thyristor surge suppression unit is greater than the clamping voltage in the direction from the first end to the second end of the bidirectional voltage suppressor. The breakover voltage in the direction from the (Continued)

second end to the first end of the thyristor surge suppression unit is less than the clamping voltage in the direction from the second end to the first end of the bidirectional voltage suppressor.

12 Claims, 11 Drawing Sheets

(56) References Cited

U.S. PATENT DOCUMENTS

| | | | | |
|---|---|---|---|---|
| 5,436,786 A * | 7/1995 | Pelly | ...................... | H02H 9/041 361/111 |
| 5,757,599 A * | 5/1998 | Crane | ................ | H03K 17/0828 361/56 |
| 5,883,775 A * | 3/1999 | Maytum | ................ | H02H 9/041 361/119 |
| 7,283,341 B2 * | 10/2007 | Lehuede | ................ | H02H 9/041 361/56 |
| 8,717,726 B2 * | 5/2014 | De Palma | .............. | H02H 9/041 361/91.5 |
| 2007/0121257 A1 * | 5/2007 | Maitra | ................... | H01H 9/542 361/2 |
| 2009/0231772 A1 * | 9/2009 | Hsiung | ..................... | H02J 7/14 361/93.9 |
| 2009/0273868 A1 | 11/2009 | Liu et al. | | |
| 2012/0250205 A1 * | 10/2012 | Pfitzer | ................... | H02H 9/041 361/91.1 |
| 2013/0321970 A1 * | 12/2013 | Miller | ..................... | H02H 9/06 361/118 |
| 2016/0276821 A1 * | 9/2016 | Politis | ...................... | H02H 9/02 |
| 2017/0047733 A1 * | 2/2017 | Buchanan | .............. | H02H 9/041 |
| 2017/0187181 A1 * | 6/2017 | Kashyap | ................ | H02H 9/041 |
| 2017/0288393 A1 * | 10/2017 | Kudou | ................... | H02H 9/044 |
| 2018/0159322 A1 * | 6/2018 | Zmuda | ............... | A61N 1/36125 |
| 2018/0183230 A1 * | 6/2018 | Kostakis | .................. | H02H 3/22 |
| 2019/0027927 A1 * | 1/2019 | Chemisky | .............. | H02H 9/042 |

FOREIGN PATENT DOCUMENTS

| | | | |
|---|---|---|---|
| CN | 104779601 A | 7/2015 | |
| CN | 106786459 A | 5/2017 | |
| CN | 206559038 U | 10/2017 | |
| JP | H01144321 A | 6/1989 | |
| WO | 2014/067272 A1 | 5/2014 | |
| WO | 2016/041377 A1 | 3/2016 | |
| WO | WO-2016041377 A1 * | 3/2016 | ............... H02H 9/06 |

OTHER PUBLICATIONS

Extended European Search Report issued in European Application No. 17887035.8, dated Jul. 8, 2020, 7 pages.

IEEE Guide for the Application of Thyristor Surge Protective Devices; IEEE Std C62.37.1-2000, IEEE Standard, IEEE, Piscataway, NJ, USA, Apr. 18, 2001, pp. 1-68.

* cited by examiner

US 11,296,497 B2

SURGE PROTECTION CIRCUIT AND ELECTRONIC DEVICE USING THE CIRCUIT

CROSS-REFERENCE TO RELATED APPLICATION

This is a national stage patent application, filed under 37 U.S.C. 371, of International Patent Application No. PCT/CN2017/116175 filed on Dec. 14, 2017, which claims priority to Chinese patent application CN 201611237528.6 filed on Dec. 28, 2016, the contents of both of which are incorporated herein by reference in their entireties.

TECHNICAL FIELD

The present disclosure relates to the field of circuit protection, for example, a surge protection circuit and an electronic device using the surge protection circuit.

BACKGROUND

An electronic device is often interfered with by an overvoltage. This overvoltage includes an overvoltage generated by a lightning stroke and an overvoltage of a power supply system. An overvoltage may damage the equipment. Thus, protective measures must be taken to reduce the overvoltage to an acceptable level.

To protect the electronic device, a surge protection circuit may be used. FIG. 1 shows a surge protection circuit in the existing art. In this surge protection circuit, a bidirectional thyristor surge suppressor (TSS) 102 is connected in series with a unidirectional transient voltage suppressor (TVS) 104. The first end of the bidirectional TSS is connected to the positive electrode of the power supply. The negative electrode of the unidirectional TVS is connected to the second end of the bidirectional TSS. The positive electrode of the unidirectional TVS is connected to the negative electrode of the power supply. Thus, when the port of the power supply is impacted by a surge from the positive electrode to the negative electrode, the bidirectional TSS and the unidirectional TVS are conductive so that the surge current is shunted. Moreover, the unidirectional TVS clamps the surge voltage between the two ends of the unidirectional TVS to a clamping voltage. When the port of the power supply is impacted by a surge from the negative electrode to the positive electrode, the bidirectional TSS and the unidirectional TVS are conductive so that the surge current is shunted.

However, the preceding surge protection circuit has the disadvantage that the lightning protection performance of the circuit varies significantly when the DC power port is subjected to lightning strokes of different (positive or negative) polarities. In the case of a lightning stroke from the negative electrode of the power supply to the positive electrode of the power supply, the residual voltage between the two ends of the surge protection circuit is high. When the circuit to be protected is connected to the surge protection circuit for use, the current entering the circuit to be protected is high and easily damages the circuit to be protected.

SUMMARY

In the present disclosure, a surge protection circuit is provided to solve the problem where when a protection module in the existing art is subjected to a lightning stroke from the negative electrode of the power supply to the positive electrode of the power supply, the residual voltage between the two ends of the module is high, and the current entering the protected circuit is high and easily damages the protected circuit.

A surge protection circuit includes: a bidirectional voltage suppressor; and a thyristor surge suppression unit connected in parallel with the bidirectional voltage suppressor, where a first end of the bidirectional voltage suppressor is connected to a first end of the thyristor surge suppression unit, and a second end of the bidirectional voltage suppressor is connected to a second end of the thyristor surge suppression unit.

The breakover voltage or the breakdown voltage in the direction from the first end of the thyristor surge suppression unit to the second end of the thyristor surge suppression unit is greater than the clamping voltage in the direction from the first end of the bidirectional voltage suppressor to the second end of the bidirectional voltage suppressor.

The breakover voltage in the direction from the second end of the thyristor surge suppression unit to the first end of the thyristor surge suppression unit is less than the clamping voltage in the direction from the second end of the bidirectional voltage suppressor to the first end of the bidirectional voltage suppressor.

Optionally, the thyristor surge suppression unit is an asymmetric thyristor surge suppression unit.

Optionally, the asymmetric thyristor surge suppression unit is a forward conductive and reversely non-conductive thyristor surge suppressor.

Optionally, the asymmetric thyristor surge suppression unit is a bidirectional asymmetric thyristor surge suppressor, and the breakover voltage in the direction from a first end of the bidirectional asymmetric thyristor surge suppressor to a second end of the bidirectional asymmetric thyristor surge suppressor is greater than the breakover voltage in the direction from the second end of the bidirectional asymmetric thyristor surge suppressor to the first end of the bidirectional asymmetric thyristor surge suppressor.

Optionally, the asymmetric thyristor surge suppression unit includes a unidirectional diode and a thyristor surge suppressor, and the bidirectional voltage suppressor is connected in parallel with the unidirectional diode and the thyristor surge suppressor which are connected in series. A cathode of the unidirectional diode is connected to the first end of the bidirectional voltage suppressor, or an anode of the unidirectional diode is connected to the second end of the bidirectional voltage suppressor.

Optionally, the bidirectional voltage suppressor is a bidirectional transient voltage suppressor (TVS), a bidirectional asymmetric TVS, a voltage-dependent resistor, or a bidirectional Zener diode.

Optionally, the clamping voltage in the direction from a first end of the bidirectional asymmetric TVS to a second end of the bidirectional asymmetric TVS is less than the clamping voltage in the direction from the second end of the bidirectional asymmetric TVS to the first end of the bidirectional asymmetric TVS.

Optionally, the surge protection circuit further includes a tripping device. The thyristor surge suppression unit is connected in parallel with the tripping device and the bidirectional voltage suppressor which are connected in series, or the bidirectional voltage suppressor is connected in parallel with the tripping device and the thyristor surge suppression unit which are connected in series.

Optionally, the surge protection circuit further includes two tripping devices, which comprise a first tripping device and a second tripping device. The first tripping device and the bidirectional voltage suppressor are connected in series to form a first branch, the second tripping device and the thyristor surge suppression unit are connected in series to form a second branch, and the first branch is connected in parallel with the second branch.

Optionally, the surge protection circuit further includes a unidirectional diode. The thyristor surge suppression unit is connected in parallel with the unidirectional diode and the bidirectional voltage suppressor which are connected in series. An anode of the unidirectional diode is connected to the first end of the thyristor surge suppression unit, or a cathode of the unidirectional diode is connected to the second end of the thyristor surge suppression unit.

Further provided is an electronic device. The electronic device includes a main circuit comprising an input end; and any surge protection circuit described above. In the electronic device, the surge protection circuit is connected in parallel with the main circuit and connected to the input end of the main circuit.

The surge protection circuit provided in the present disclosure can reduce the residual voltage between the two ends of the surge protection circuit, and can further significantly reduce the shunt of the subsequent circuit and improve the surge protection capability. Thus, the surge protection circuit provided in the present disclosure can effectively protect the electronic device from the surge current.

DETAILED DESCRIPTION

Figure 1:
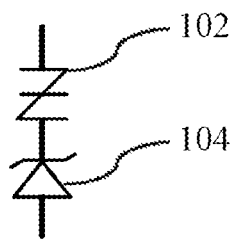
FIG. 1 is a schematic diagram of a surge protection circuit in the existing art.
Figure 2:
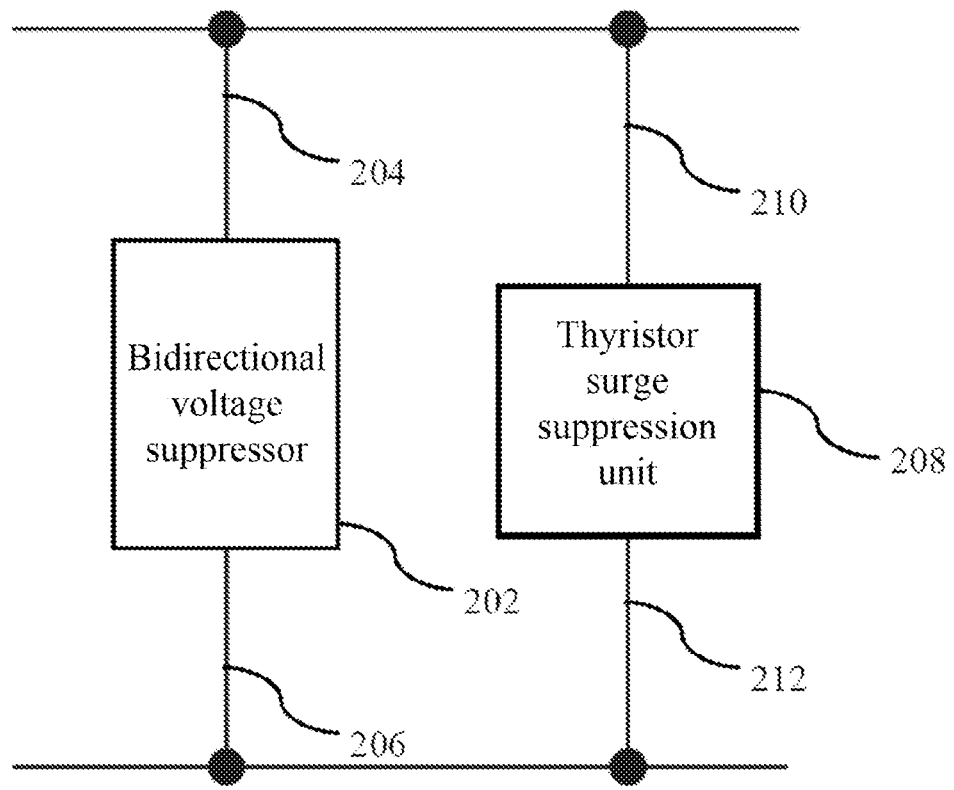
FIG. 2 is a schematic diagram of a surge protection circuit according to an embodiment.

As shown in FIG. 2, a surge protection circuit provided in the present embodiment includes a bidirectional voltage suppressor 202 and a thyristor surge suppression unit 208 connected in parallel with the bidirectional voltage suppressor 202. The first end 204 of the bidirectional voltage suppressor 202 is connected to the first end 210 of the thyristor surge suppression unit 208. The second end 206 of the bidirectional voltage suppressor 202 is connected to the second end 212 of the thyristor surge suppression unit 208. The breakover voltage or the breakdown voltage in the direction from the first end 210 of the thyristor surge suppression unit 208 to the second end 212 of the thyristor surge suppression unit 208 is greater than the clamping voltage in the direction from the first end 204 of the bidirectional voltage suppressor to the second end 206 of the bidirectional voltage suppressor. The breakover voltage in the direction from the second end 212 of the thyristor surge suppression unit 208 to the first end 210 of the thyristor surge suppression unit 208 is less than the clamping voltage in the direction from the second end 206 of the bidirectional voltage suppressor to the first end 204 of the bidirectional voltage suppressor.

In the surge protection circuit provided in the present embodiment, the bidirectional voltage suppressor is connected in parallel with the thyristor surge suppression unit. The breakover voltage or the breakdown voltage in the direction from the first end of the thyristor surge suppression unit to the second end of the thyristor surge suppression unit is greater than the clamping voltage in the direction from the first end of the bidirectional voltage suppressor to the second end of the bidirectional voltage suppressor, and the breakover voltage in the direction from the second end of the thyristor surge suppression unit to the first end of the thyristor surge suppression unit is less than the clamping voltage in the direction from the second end of the bidirectional voltage suppressor to the first end of the bidirectional voltage suppressor. When the surge protection circuit is impacted by a surge from the first end of the bidirectional voltage suppressor to the second end of the bidirectional voltage suppressor, the bidirectional voltage suppressor is conductive to shunt the surge current, and the surge voltage between the two ends of the bidirectional voltage suppressor is clamped to the clamping voltage in the direction from the first end to the second end of the bidirectional voltage suppressor. When the surge protection circuit is impacted by a surge from the second end of the thyristor surge suppression unit to the first end of the thyristor surge suppression unit, the thyristor surge suppression unit is conductive to shunt the surge current, and the surge voltage between the two ends of the thyristor surge suppression unit is clamped to an on-state voltage. The preceding surge protection circuit can reduce the residual voltage between the two ends of the surge protection circuit, thereby significantly reducing the shunt of the subsequent circuit and improving the surge protection capability. Thus, the surge protection circuit provided in the present disclosure can effectively protect the electronic device from the surge current.

The thyristor surge suppression unit refers to a unit that integrally exhibits the characteristics of the thyristor surge suppressor. The thyristor surge suppression unit may be symmetrical or asymmetric as long as the breakover voltage or the breakdown voltage in the direction from the first end of the thyristor surge suppression unit to the second end of the thyristor surge suppression unit is greater than the clamping voltage in the direction from the first end of the bidirectional voltage suppressor to the second end of the bidirectional voltage suppressor and as long as the breakover voltage in the direction from the second end of the thyristor surge suppression unit to the first end of the thyristor surge suppression unit is less than the clamping voltage in the direction from the second end of the bidirectional voltage suppressor to the first end of the bidirectional voltage suppressor. Optionally, the thyristor surge suppression unit is an asymmetric thyristor surge suppression unit. The asymmetric thyristor surge suppression unit is a unit that integrally exhibits a characteristic curve that satisfies the conditions: the asymmetric thyristor surge suppression unit has a characteristic of reverse non-conductiveness of an ordinary diode in the direction from its first end to its second end, and has a characteristic of TSS in the direction from its second end to its first end. Alternatively, the asymmetric thyristor surge suppression unit has the TSS-specific switching characteristic in the two directions and has different electrical parameters in the two directions.

Figure 3A:
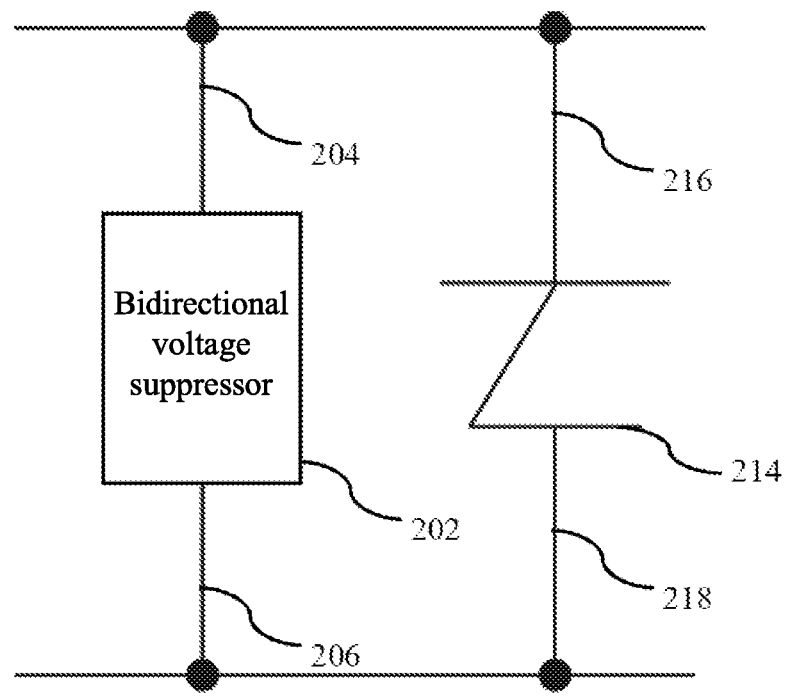
FIG. 3A is a schematic diagram of a surge protection circuit in which an asymmetric thyristor surge suppression unit is a forward conductive and reversely non-conductive TSS according to an embodiment.
Figure 3B:
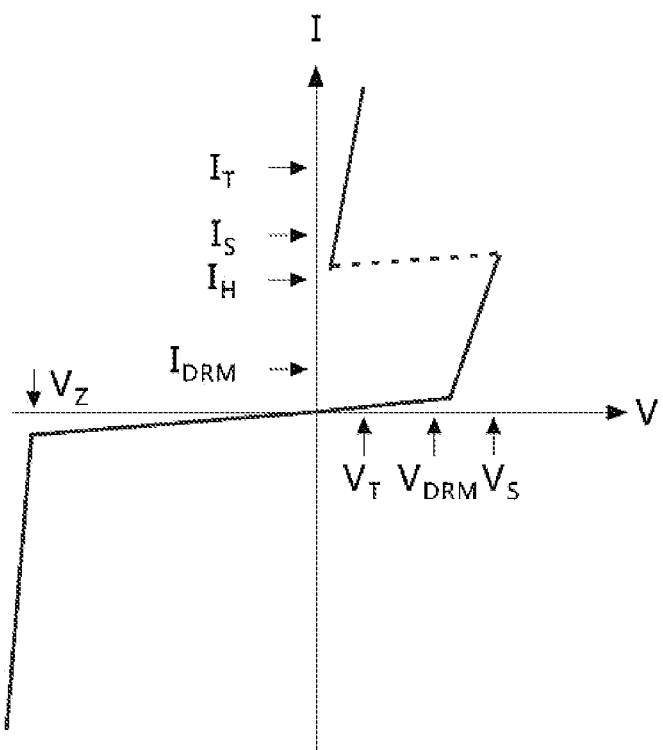
FIG. 3B is a V-I curve of a forward conductive and reversely non-conductive TSS according to an embodiment.

Optionally, as shown in FIG. 3A, the asymmetric thyristor surge suppression unit is a forward conductive and reversely non-conductive thyristor surge suppressor (TSS) 214. The forward conductive and reversely non-conductive TSS has a characteristic of reverse non-conductiveness of an ordinary diode in the direction from its first end 216 to its second end 218 and has the switching characteristic of TSS in the direction from its second end 218 to its first end 216. The V-I curve of the forward conductive and reversely non-conductive TSS is shown in FIG. 3B. The breakdown voltage Vz in the direction from the first end to the second end of the forward conductive and reversely non-conductive TSS is greater than the clamping voltage in the direction from the first end to the second end of the bidirectional voltage suppressor. The breakover voltage Vs in the direction from the second end to the first end of the forward conductive and reversely non-conductive TSS is less than the clamping voltage in the direction from the second end to the first end of the bidirectional voltage suppressor.

Figure 3C:
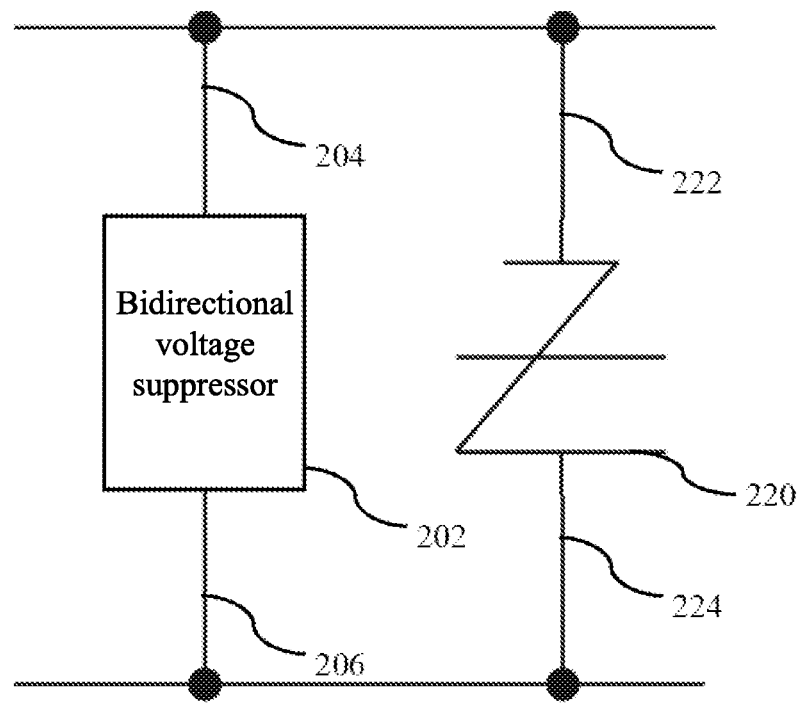
FIG. 3C is a schematic diagram of a surge protection circuit in which an asymmetric thyristor surge suppression unit is a bidirectional asymmetric TSS according to an embodiment.
Figure 3D:
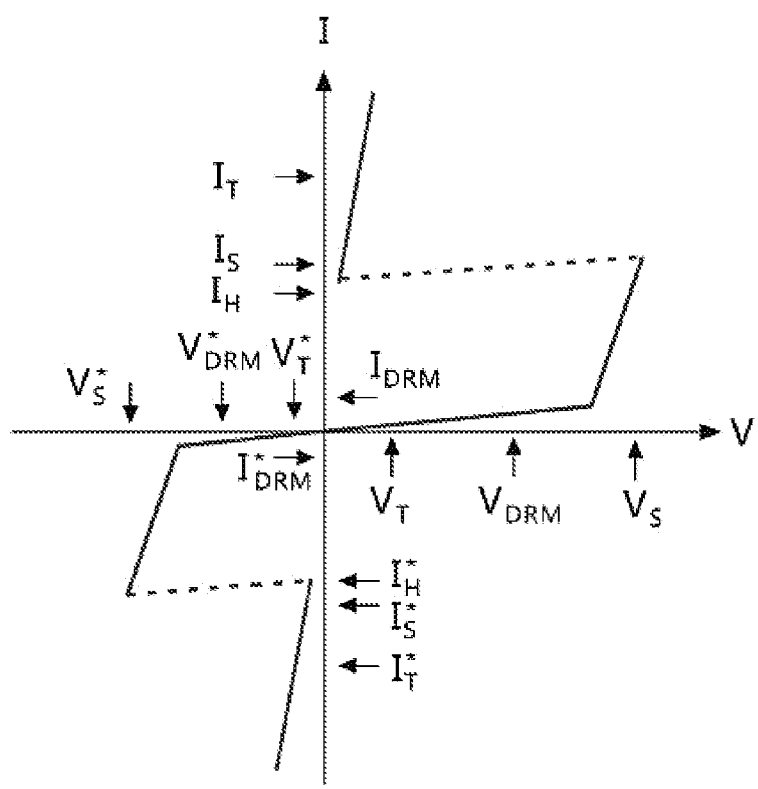
FIG. 3D is a V-I curve of a bidirectional asymmetric TSS according to an embodiment.

Optionally, as shown in FIG. 3C, the asymmetric thyristor surge suppression unit is a bidirectional asymmetric thyristor surge suppressor (TSS) 220. The bidirectional asymmetric TSS 220 has the TSS-specific switching characteristic in both the direction from its first end to its second end and the direction from its second end to its first end and has different electrical parameters in the two directions. For example, the breakover voltage in the direction from its first end to its second end is greater than the breakover voltage in the direction from its second end to its first end. The V-I curve of the bidirectional asymmetric TSS 220 is shown in FIG. 3D. In FIG. 3D, Vdrm≠Vdrm*, Vs≠Vs*, Vt≠Vt*, It≠It*, Is≠Is*, Ih≠Ih*, and Idrm≠Idrm*. In this embodiment, the breakover voltage Vs in the direction from the first end 222 of the bidirectional asymmetric TSS 220 to the second end 224 of the bidirectional asymmetric TSS 220 is greater than the breakover voltage Vs* in the direction from the second end 224 of the bidirectional asymmetric TSS 220 to the first end 222 of the bidirectional asymmetric TSS 220. The breakover voltage Vs in the direction from the first end of the bidirectional asymmetric TSS to the second end of the bidirectional asymmetric TSS is greater than the clamping voltage in the direction from the first end of the bidirectional voltage suppressor to the second end of the bidirectional voltage suppressor. The breakover voltage Vs* in the direction from the second end of the bidirectional asymmetric TSS to the first end of the bidirectional asymmetric TSS is less than the clamping voltage in the direction from the second end of the bidirectional voltage suppressor to the first end of the bidirectional voltage suppressor.

Figure 3E:
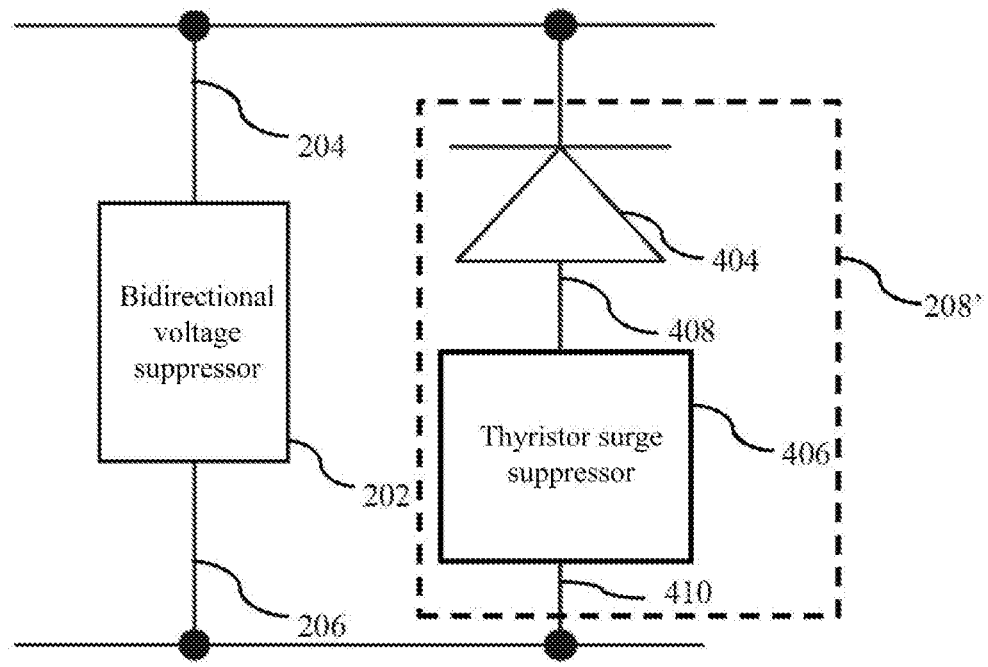
FIG. 3E is a schematic diagram of an asymmetric thyristor surge suppression unit according to another embodiment.

Optionally, the asymmetric thyristor surge suppression unit 208' includes a unidirectional diode 404 and a thyristor surge suppressor 406. As shown in FIG. 3E, the bidirectional voltage suppressor 202 is connected in parallel with the unidirectional diode 404 and the thyristor surge suppressor 406 which are connected in series, the cathode of the unidirectional diode is connected to the first end 204 of the bidirectional voltage suppressor 202, the anode of the unidirectional diode is connected to the first end 408 of the thyristor surge suppressor 406, and the second end 410 of the thyristor surge suppressor 406 is connected to the second end 206 of the bidirectional voltage suppressor 202. The thyristor surge suppressor in FIG. 3E may be an ordinary thyristor surge suppressor. In the direction from the cathode of the unidirectional diode to the second end of the thyristor surge suppressor, the breakdown voltage formed by the unidirectional diode and the thyristor surge suppressor which are in series connection is greater than the clamping voltage in the direction from the first end of the bidirectional voltage suppressor to the second end of the bidirectional voltage suppressor. In the direction from the second end of the thyristor surge suppressor to the cathode of the unidirectional diode, the breakover voltage formed by the unidirectional diode and the thyristor surge suppressor which are in series connection is less than the clamping voltage in the direction from the second end of the bidirectional voltage suppressor to the first end of the bidirectional voltage suppressor. Optionally, the thyristor surge suppressor herein may be a forward conductive and reversely non-conductive thyristor surge suppressor or a bidirectional asymmetric thyristor surge suppressor as mentioned above. The first end and the second end of the thyristor surge suppressor respectively correspond to the first end and the second end of the forward conductive and reversely non-conductive thyristor surge suppressor, or the first end and the second end of the thyristor surge suppressor respectively correspond to the first end and the second end of the bidirectional asymmetric thyristor surge suppressor. In FIG. 3E, the position of the unidirectional diode is not fixed. Optionally, the position of the unidirectional diode 404 may be interchanged with the position of the thyristor surge suppressor 406. That is, the anode of the unidirectional diode is connected to the second end of the bidirectional voltage suppressor, the cathode of the unidirectional diode is connected to the second end of the thyristor surge suppressor, and the first end of the thyristor surge suppressor is connected to the first end of the bidirectional voltage suppressor.

Optionally, as shown in FIGS. 4A to 4D, the bidirectional voltage suppressor may be a bidirectional TVS 302, a bidirectional asymmetric TVS 308, a voltage-dependent resistor 314, or a bidirectional Zener diode 320. When the bidirectional voltage suppressor is a bidirectional TVS 302, the first end 304 of the bidirectional TVS 302 is connected to the first end 210 of the thyristor surge suppression unit 208, and the second end 306 of the bidirectional TVS 302 is connected to the second end 212 of the thyristor surge suppression unit 208. When the bidirectional voltage suppressor is a bidirectional asymmetric TVS 308, the first end 310 of the bidirectional asymmetric TVS 308 is connected to the first end 210 of the thyristor surge suppression unit 208, and the second end 312 of the bidirectional asymmetric TVS 308 is connected to the second end 212 of the thyristor surge suppression unit 208. When the bidirectional voltage suppressor is a voltage-dependent resistor 314, the first end 316 of the voltage-dependent resistor 314 is connected to the first end 210 of the thyristor surge suppression unit 208, and the second end 318 of the voltage-dependent resistor 314 is connected to the second end 212 of the thyristor surge suppression unit 208. When the bidirectional voltage suppressor is a bidirectional voltage-regulator tube 320, the first end 322 of the bidirectional voltage-regulator tube 320 is connected to the first end 210 of the thyristor surge suppression unit 208, and the second end 328 of the bidirectional voltage-regulator tube 320 is connected to the second end 212 of the thyristor surge suppression unit 208.

As described above, the thyristor surge suppression unit may be an asymmetric thyristor surge suppression unit. The asymmetric thyristor surge suppression unit may be a forward conductive and reversely non-conductive TSS, a bidirectional asymmetric TSS, or a unit composed of a thyristor surge suppressor and a diode that are connected in series. Thus, in this embodiment, the surge protection circuit may be formed of a first unit and a second unit that are connected in parallel. The first unit is a bidirectional TVS, a bidirectional asymmetric TVS, a voltage-dependent resistor, or a bidirectional Zener diode. The second unit is a forward conductive and reversely non-conductive TSS, a bidirectional asymmetric TSS, or a unit composed of a thyristor surge suppressor and a diode that are connected in series.

Figure 4A:
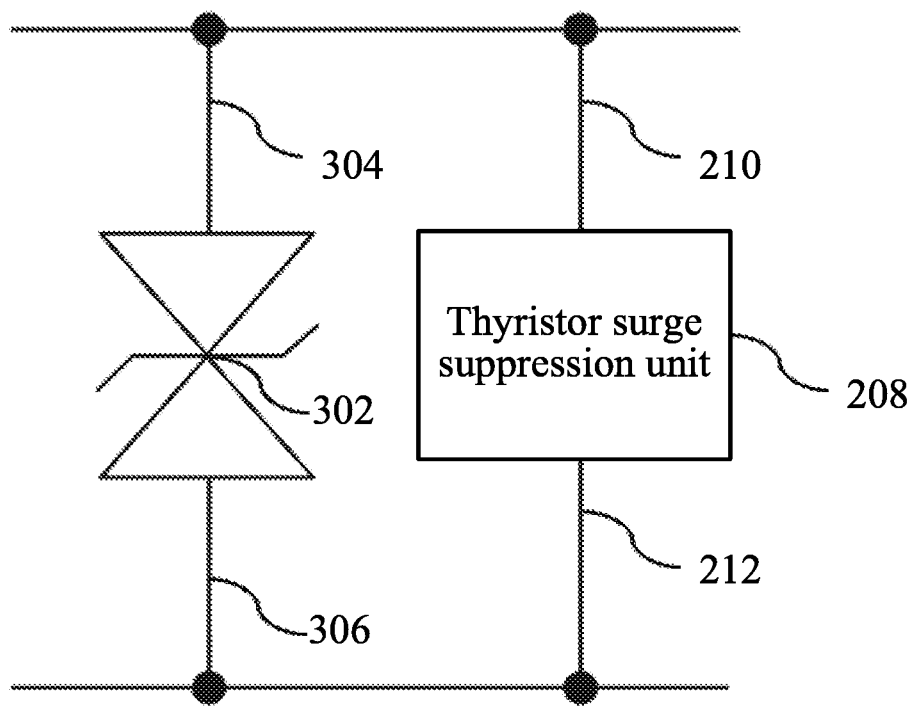
FIG. 4A is a schematic diagram of a surge protection circuit in which a bidirectional voltage suppressor is a bidirectional TVS according to another embodiment.
Figure 4B:
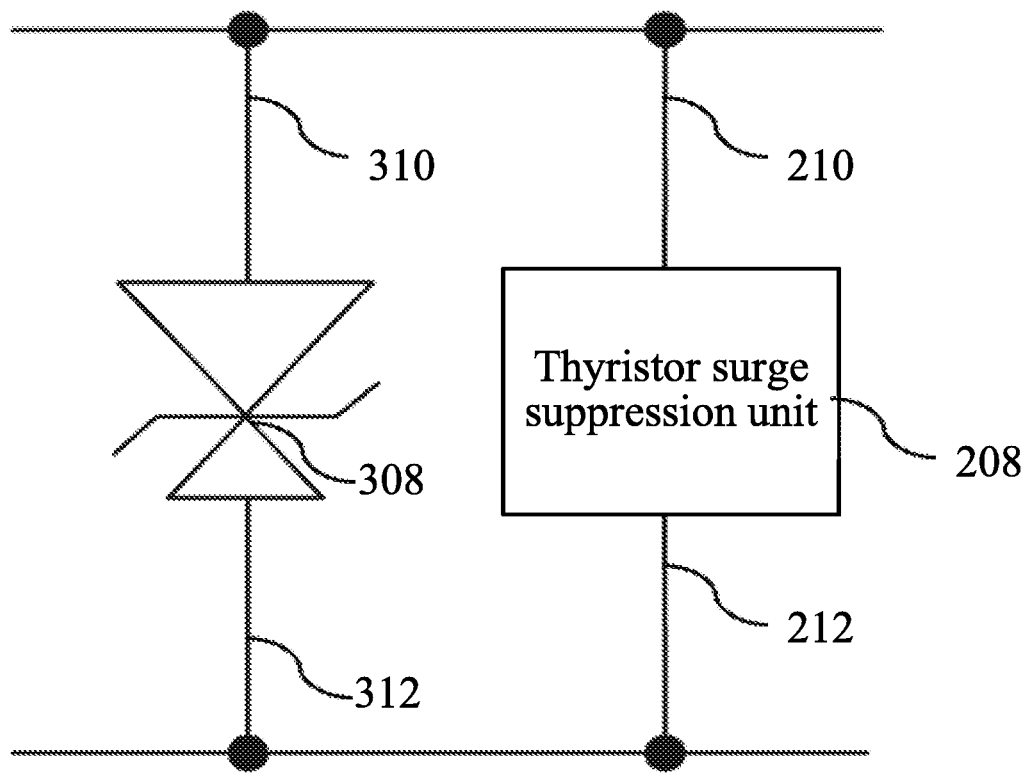
FIG. 4B is a schematic diagram of a surge protection circuit in which a bidirectional voltage suppressor is a bidirectional asymmetric TVS according to an embodiment.
Figure 4C:
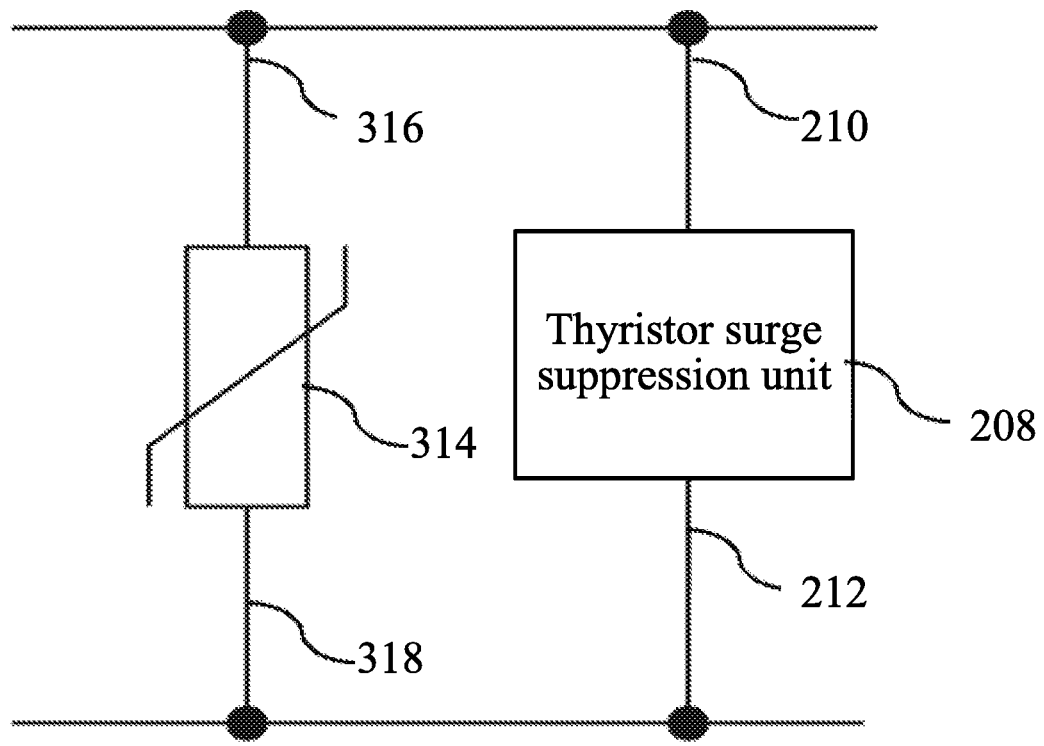
FIG. 4C is a schematic diagram of a surge protection circuit in which a bidirectional voltage suppressor is a voltage-dependent resistor according to an embodiment.
Figure 4D:
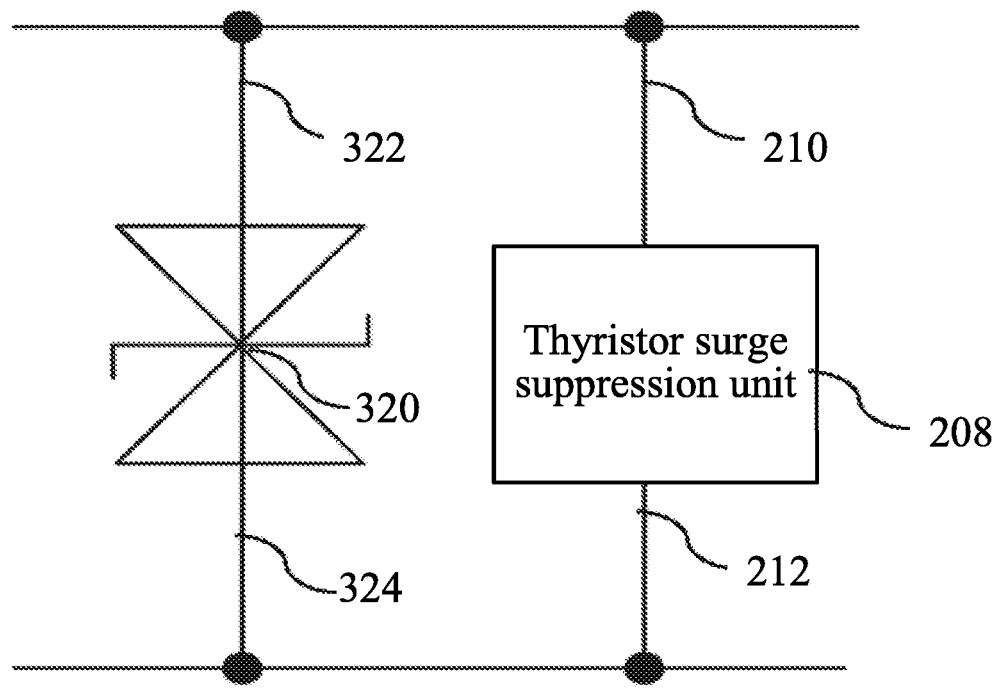
FIG. 4D is a schematic diagram of a surge protection circuit in which a bidirectional voltage suppressor is a bidirectional voltage-regulator tube according to an embodiment.
Figure 4E:
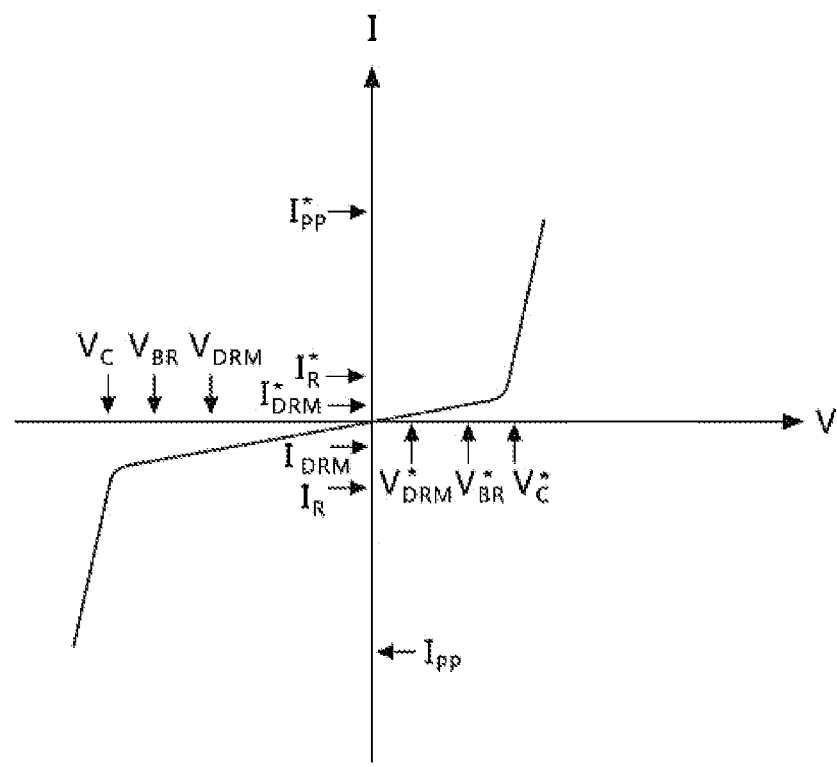
FIG. 4E is a V-I curve of a bidirectional asymmetric TVS according to an embodiment.

Optionally, the bidirectional voltage suppressor may be a bidirectional asymmetric TVS. The bidirectional asymmetric TVS has a clamping characteristic in both the direction from its first end to its second end and the direction from its second end to its first end. The asymmetry means that electrical parameters in the two directions are different. For example, the clamping voltage in the direction from its first end to its second end is greater than the clamping voltage in the direction from its second end to its first end. The V-I curve of the bidirectional asymmetric TVS is shown in FIG. 4E. In the FIG. 4E, Vc≠Vc*, Vbr≠≠VBR*, VDRM≠VDRM*, IPP≠IPP*, IR≠IR*, and IDRM≠IDRM*. Optionally, for the bidirectional asymmetric TVS, the clamping voltage Vc* in the direction from its first end to its second end is less than the clamping voltage Vc in the direction from its second end to its first end. In this embodiment, that Vc* is less than Vc can reduce the residual voltage in the direction from the first end to the second end of the bidirectional asymmetric TVS, thereby improving the performance of the surge protection circuit.

Figure 5A:
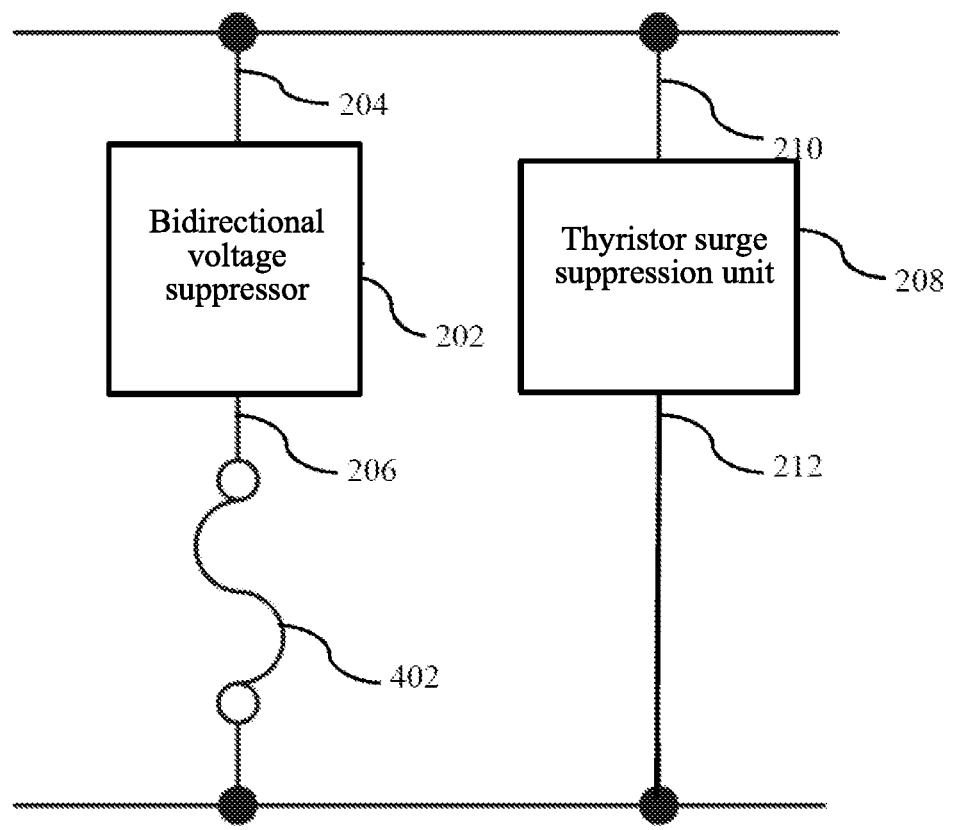
FIG. 5A is a schematic diagram of a surge protection circuit including one tripping device according to an embodiment.
Figure 5B:
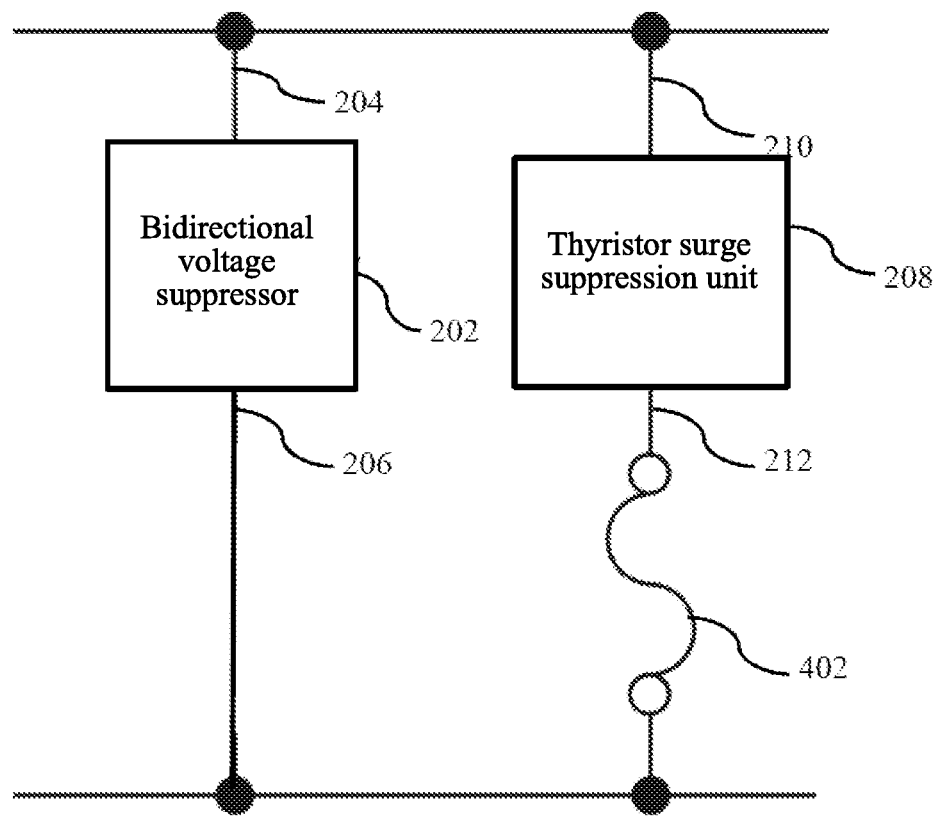
FIG. 5B is a schematic diagram of a surge protection circuit including one tripping device according to another embodiment.

Optionally, the surge protection circuit further includes a tripping device 402. As shown in FIGS. 5A and 5B, the thyristor surge suppression unit 208 is connected in parallel with the tripping device 402 and the bidirectional voltage suppressor 202 which are connected in series, or the bidirectional voltage suppressor 202 is connected in parallel with the tripping device 402 and the thyristor surge suppression unit 208 which are connected in series. The position of the tripping device 402 in FIGS. 5A and 5B is not fixed. The position of the tripping device 402 in FIG. 5A may be interchanged with the position of the bidirectional voltage suppressor. Likewise, the position of the tripping device in FIG. 5B may be interchanged with the position of the thyristor surge suppression unit.

Figure 5C:
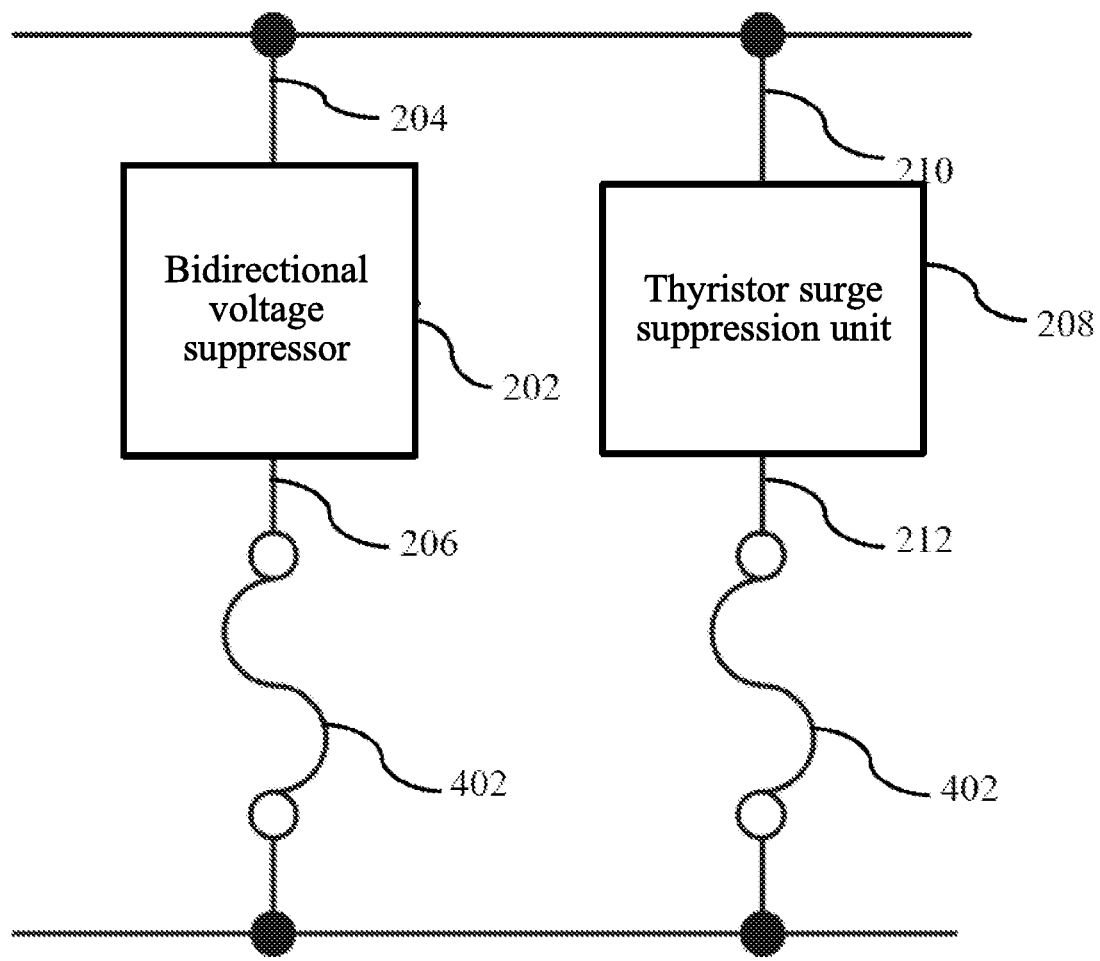
FIG. 5C is a schematic diagram of a surge protection circuit including two tripping devices according to an embodiment.

Alternatively, the surge protection circuit includes two tripping devices 402, which are a first tripping device and a second tripping device. The first tripping device and the bidirectional voltage suppressor 202 are connected in series to form a first branch. The second tripping device and the thyristor surge suppression unit are connected in series to form a second branch. The first branch is connected in parallel with the second branch. See FIG. 5C. Likewise, the positions of the tripping devices in the figure are not fixed and may be interchanged with the position of the bidirectional voltage suppressor or the position of the thyristor surge suppression unit.

The addition of a tripping device ensures the safety of the surge protection circuit. Under an extreme condition of the circuit, for example, under the condition of the circuit heating caused by an overhigh current, the tripping device 402 may cut off the branch where the tripping device 402 is located to avoid an accident like circuit burnout.

Figure 6:
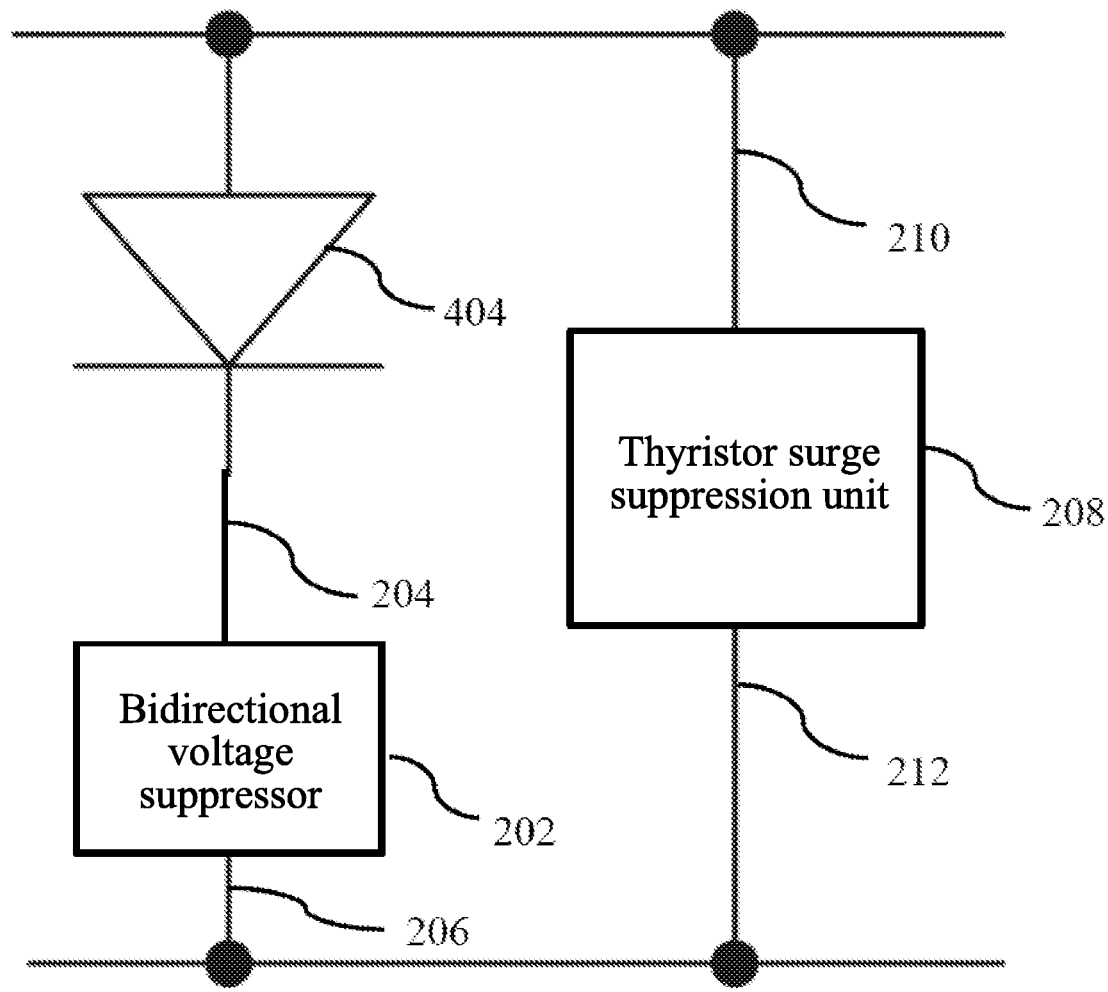
FIG. 6 is a schematic diagram of a surge protection circuit according to another embodiment.

Optionally, the surge protection circuit may further include a unidirectional diode 404. As shown in FIG. 6, the thyristor surge suppression unit 208 is connected in parallel with the unidirectional diode 404 and the bidirectional voltage suppressor 202 which are connected in series, the anode of the unidirectional diode 404 is connected to the first end 210 of the thyristor surge suppression unit 208, the cathode of the unidirectional diode is connected to the first end 204 of the bidirectional voltage suppressor 202, and the second end 206 of the bidirectional voltage suppressor 202 is connected to the second end 212 of the thyristor surge suppression unit 208. The position of the unidirectional diode in FIG. 6 is not fixed. Optionally, the position of the unidirectional diode 404 may be interchanged with the position of the bidirectional voltage suppressor. That is, the cathode of the unidirectional diode is connected to the second end of the thyristor surge suppression unit, the anode of the unidirectional diode is connected to the second end of the bidirectional voltage suppressor, and the first end of the bidirectional voltage suppressor is connected to the first end of the thyristor surge suppression unit.

The addition of a diode to the circuit further ensures that when a surge flows from the second end of the thyristor surge suppression unit to the first end of the thyristor surge suppression unit, the surge current is discharged through the thyristor surge suppression unit and does not pass through the bidirectional voltage suppressor.

Figure 7:
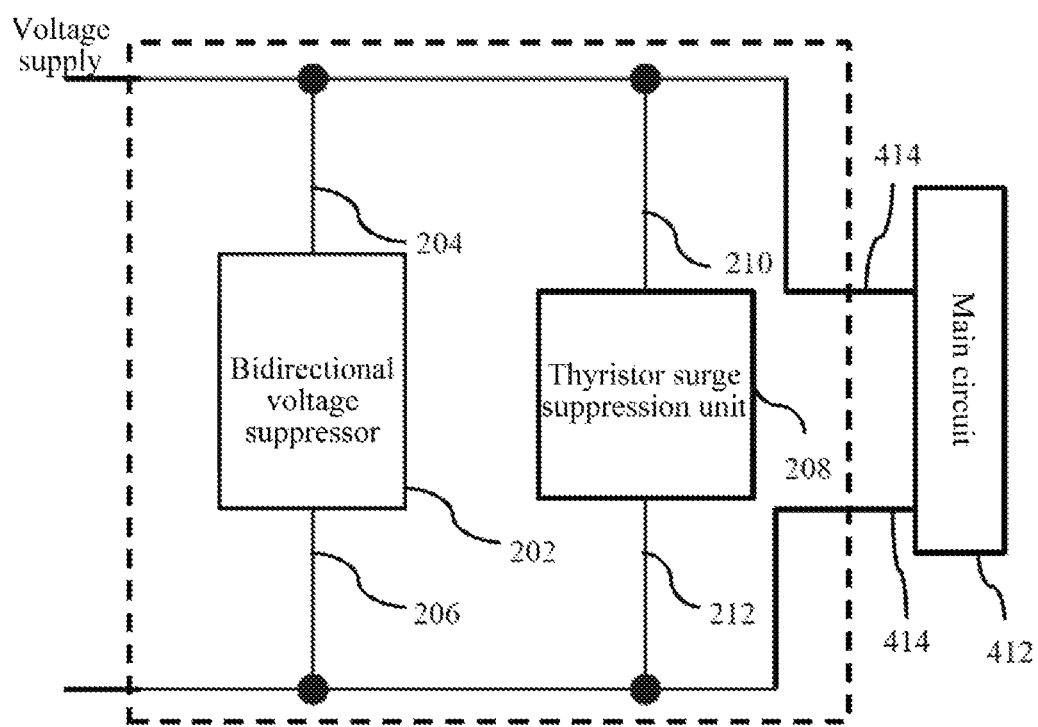
FIG. 7 is a schematic diagram of an electronic device according to an embodiment.

As shown in FIG. 7, an electronic device is provided in this embodiment. The electronic device includes a main circuit 412 and the preceding surge protection circuit. The main circuit 412 has input ends 414. The surge protection circuit is connected in parallel with the main circuit and connected to the input end 414 of the main circuit. The surge protection circuit is disposed before the main circuit 412 to protect the main circuit from a surge, so that the electronic device has a good surge protection capability.

INDUSTRIAL APPLICABILITY

The surge protection circuit provided in the present disclosure can reduce the residual voltage between the two ends of the protection module, significantly reduce the shunt of the subsequent circuit, improve the surge protection capability, and better protect an electronic device from the surge current.

What is claimed is:

1. A surge protection circuit comprising:
a bidirectional voltage suppressor; and
only one forward conductive and reversely non-conductive thyristor surge suppressor connected in parallel with the bidirectional voltage suppressor, wherein a first end of the bidirectional voltage suppressor is connected to a first end of the one forward conductive and reversely non-conductive thyristor surge suppressor, and a second end of the bidirectional voltage suppressor is connected to a second end of the one forward conductive and reversely non-conductive thyristor surge suppressor,
wherein a breakover voltage or a breakdown voltage in a direction from the first end of the one forward conductive and reversely non-conductive thyristor surge suppressor to the second end of the one forward conductive and reversely non-conductive thyristor surge suppressor is greater than a clamping voltage in a direction from the first end of the bidirectional voltage suppressor to the second end of the bidirectional voltage suppressor; and
wherein a breakover voltage in a direction from the second end of the one forward conductive and reversely non-conductive thyristor surge suppressor to the first end of the one forward conductive and reversely non-conductive thyristor surge suppressor is less than a clamping voltage in a direction from the second end of the bidirectional voltage suppressor to the first end of the bidirectional voltage suppressor.

2. The surge protection circuit of claim 1, wherein the bidirectional voltage suppressor is a bidirectional transient voltage suppressor (TVS), a bidirectional asymmetric TVS, a voltage-dependent resistor, or a bidirectional Zener diode.

3. The surge protection circuit of claim 2, wherein a clamping voltage in a direction from a first end of the bidirectional asymmetric TVS to a second end of the bidirectional asymmetric TVS is less than a clamping voltage in a direction from the second end of the bidirectional asymmetric TVS to the first end of the bidirectional asymmetric TVS.

4. The surge protection circuit of claim 1, further comprising a tripping device,
wherein the one forward conductive and reversely non-conductive thyristor surge suppressor is connected in parallel to a branch composed of both the tripping device and the bidirectional voltage suppressor which are connected in series, or the bidirectional voltage suppressor is connected in parallel to a branch composed of both the tripping device and the one forward conductive and reversely non-conductive thyristor surge suppressor which are connected in series.

5. The surge protection circuit of claim 1, further comprising two tripping devices, which comprise a first tripping device and a second tripping device,
wherein the first tripping device and the bidirectional voltage suppressor are connected in series to form a first branch, the second tripping device and the one forward conductive and reversely non-conductive thyristor surge suppressor are connected in series to form a second branch, and the first branch is connected in parallel with the second branch.

6. The surge protection circuit of claim 1, further comprising a unidirectional diode, wherein the one forward conductive and reversely non-conductive thyristor surge suppressor is connected in parallel to a branch composed of both the unidirectional diode and the bidirectional voltage suppressor which are connected in series,
wherein an anode of the unidirectional diode is connected to the first end of the one forward conductive and reversely non-conductive thyristor surge suppressor, or a cathode of the unidirectional diode is connected to the second end of the one forward conductive and reversely non-conductive thyristor surge suppressor.

7. An electronic device, comprising:
a main circuit comprising an input end; and
a surge protection circuit, wherein the surge protection circuit comprises a bidirectional voltage suppressor; and only one forward conductive and reversely non-conductive thyristor surge suppressor connected in parallel with the bidirectional voltage suppressor,
wherein a first end of the bidirectional voltage suppressor is connected to a first end of the one forward conductive and reversely non-conductive thyristor surge suppressor, and a second end of the bidirectional voltage suppressor is connected to a second end of the one forward conductive and reversely non-conductive thyristor surge suppressor,
wherein a breakover voltage or a breakdown voltage in a direction from the first end of the one forward conductive and reversely non-conductive thyristor surge suppressor to the second end of the one forward conductive and reversely non-conductive thyristor surge suppressor is greater than a clamping voltage in a direction from the first end of the bidirectional voltage suppressor to the second end of the bidirectional voltage suppressor,
wherein a breakover voltage in a direction from the second end of the one forward conductive and reversely non-conductive thyristor surge suppressor to the first end of the one forward conductive and reversely non-conductive thyristor surge suppressor is less than a clamping voltage in a direction from the second end of the bidirectional voltage suppressor to the first end of the bidirectional voltage suppressor, and
wherein the surge protection circuit is connected in parallel with the main circuit and connected to the input end of the main circuit.

8. The electronic device of claim 7, wherein the bidirectional voltage suppressor is a bidirectional transient voltage suppressor (TVS), a bidirectional asymmetric TVS, a voltage-dependent resistor, or a bidirectional Zener diode.

9. The electronic device of claim 8, wherein a clamping voltage in a direction from a first end of the bidirectional asymmetric TVS to a second end of the bidirectional asymmetric TVS is less than a clamping voltage in a direction from the second end of the bidirectional asymmetric TVS to the first end of the bidirectional asymmetric TVS.

10. The electronic device of claim 7, wherein the surge protection circuit further comprises a tripping device,
wherein the one forward conductive and reversely non-conductive thyristor surge suppressor is connected in parallel to a branch composed of both the tripping device and the bidirectional voltage suppressor which are connected in series, or the bidirectional voltage suppressor is connected in parallel to a branch composed of both the tripping device and the one forward conductive and reversely non-conductive thyristor surge suppressor which are connected in series.

11. The electronic device of claim 7, wherein the surge protection circuit further comprises two tripping devices, which comprise a first tripping device and a second tripping device, wherein the first tripping device and the bidirectional voltage suppressor are connected in series to form a first branch, the second tripping device and the one forward conductive and reversely non-conductive thyristor surge suppressor are connected in series to form a second branch, and the first branch is connected in parallel with the second branch.

12. The electronic device of claim 7, wherein the surge protection circuit further comprises a unidirectional diode, wherein the one forward conductive and reversely non-conductive thyristor surge suppressor is connected in parallel to a branch composed of both the unidirectional diode and the bidirectional voltage suppressor which are connected in series, wherein an anode of the unidirectional diode is connected to the first end of the one forward conductive and reversely non-conductive thyristor surge suppressor, or a cathode of the unidirectional diode is connected to the second end of the one forward conductive and reversely non-conductive thyristor surge suppressor.

* * * * *